US005257404A

United States Patent [19]

Goreham et al.

[11] Patent Number: 5,257,404

[45] Date of Patent: Oct. 26, 1993

[54] SIMULCAST SYNCHRONIZATION AND EQUALIZATION SYSTEM AND METHOD THEREFOR

[75] Inventors: Steven A. Goreham, Mount Prospect; Jan P. Vanderspool, II, Woodstock, both of Ill.

[73] Assignee: Motorola, Inc., Schaumburg, Ill.

[21] Appl. No.: 771,577

[22] Filed: Oct. 4, 1991

[51] Int. Cl.[5] .......... H04B 7/00

[52] U.S. Cl. .......... 455/51.2; 455/69; 375/107; 375/109

[58] Field of Search .......... 455/51.1, 51.2, 53.1, 455/67.5, 67.6, 69; 340/825.44; 375/107, 108, 109

[56] References Cited

U.S. PATENT DOCUMENTS

| | | | |
|---|---|---|---|
| 3,128,465 | 4/1964 | Brilliant | 455/69 |
| 4,696,051 | 9/1987 | Breeden | 455/51.2 |
| 4,696,052 | 9/1987 | Breeden | 455/51.2 |
| 4,709,401 | 11/1987 | Akerberg | 455/51.2 |
| 4,709,402 | 11/1987 | Akerberg | 455/51.2 |
| 4,718,109 | 1/1988 | Breeden et al. | 455/51.2 |
| 4,882,739 | 11/1989 | Potash et al. | 455/69 |
| 4,972,410 | 11/1990 | Cohen et al. | 455/51.2 |
| 5,014,344 | 5/1991 | Goldberg | 455/51.2 |

FOREIGN PATENT DOCUMENTS

| | | |
|---|---|---|
| 0197556A2 | 10/1986 | European Pat. Off. . |
| 0198488A1 | 10/1986 | European Pat. Off. . |

*Primary Examiner*—Reinhard J. Eisenzopf
*Assistant Examiner*—Andrew Faile
*Attorney, Agent, or Firm*—Philip P. Macnak; Daniel R. Collopy; Thomas G. Berry

[57] ABSTRACT

A simulcast transmission system (10) and method provides for time synchronizing data transmissions from a plurality of transmission stations (16, 18). The transmission stations (16, 18) include transmission clocks (36) for controlling the time of transmission of synchronization timing signals and data. The synchronization timing signals indicate a local time of transmission which are transmitted in response to system timing signals received from the control station (12). The control station (12) comprises apparatus (20) for generating and distributing the system timing signals, apparatus (26) for receiving the synchronization timing signals from the transmission stations, and apparatus (20, 22, 28) for generating and distributing time adjustment factor signals to the transmission stations (16, 18) in response to receiving the synchronization timing signals. The transmission clocks (36) are adjusted in response to the time adjustment factor signals for controlling the time of transmission of the data signals.

19 Claims, 9 Drawing Sheets

SIMULCAST SYNCHRONIZATION AND EQUALIZATION SYSTEM AND METHOD THEREFOR

RELATED APPLICATION

This application is being filed of even date with related U.S. patent application No. 07/771,911 to Vanderspool et al. entitled "Simulcast Synchronization and Equalization System and Method Terefor".

BACKGROUND OF THE INTENTION

1. Field of the Invention

The present invention relates generally to the field of simulcast transmission systems, and more particularly to a simulcast system providing system clock synchronization and carrier frequency equalization./

2. Description of the Prior Art

The primary requirement for effective operation of simulcast transmission systems, such as used in simulcast paging systems, is to minimize the difference in audio phase delay in signals originating from two different transmission stations when received at the paging receiver. The audio phase delay can be minimized by requiring that different transmission stations transmit the same paging information at precisely the same point in time; Prior art paging systems have typically concentrated on equalizing the transmission path delay, including such elements as telephone lines, microwave links or RF links, which were used to connect the paging terminal to the transmission stations. In order to achieve such equalization of the transmission path delay, delay elements were introduced into the transmission path of those transmission stations closest to the source, or origin of the signal transmission, thereby providing a substantially uniform transmission path delay for all transmission stations throughout the system. Unfortunately, once such simulcast transmission systems were equalized, there was no guarantee the equalization would remain constant throughout any particular transemission period, because several of the transmission elements, particularly the telephone lines when they were not dedicated, were subject to variation throughout the transmission period.

In order to overcome the deficiencies noted above, several prior art simulcast transmission systems have utilized which has become known as a "store and forward" transmission technique, wherein the transmission data is stored at the individual transmission stations within the system and then broadcast, or forwarded from all transmission stations at a predetermined time. Equalization of such systems have relied on the use of global positioning satellite systems which provided the accurate timing control necessary to control the timing of transmissions throughout the system. While such systems using global positioning satellites have proved effective in providing control of the transmission timing requirements, the advantages are provided at a substantial cost differential as compared to conventional simulcast transmission equalization systems.

There is a need to provide simulcast system equalization capability to without the use of a global positioning satellite system.

SUMMARY OF THE INVENTION

In accordance with one aspect of the present invention, a simulcast transmission system having means for time synchronizing data transmissions therefrom comprises a plurality of transmission stations and a control station. Each transmission station has means for receiving system timing signals from the control station, transmitting means for transmitting synchronization timing signals and data, and timing means for controlling the time of transmission of the synchronization timing signal and the data. The shynchronization timing signals indicate a local time of transmission from the transmission stations and are transmitted in response to the system timing signals received from the control station. The control station comprises means for generating and distributing the system timing signals to the plurality of transmission stations, means for receiving the synchronization timing signals transmitted from the plurality of transmission stations, means responsive to the received synchronization timing signals for generating time adjustment factor signals, and means for distributing the time adjustment factor signals to the transmission stations. The time adjustment factor signals effect adjustment of the timing means for controlling the time of transmission of the synchronization timing signals and data from the transmission stations.

In accordance with another aspect of the present invention, a method of time synchronizing data transmissions originating from a plurality of transmission stations having transmission clocks for controlling the starting time of the data transmissions and operating within a simulcast transmission system comprises the step of generating, at a control station, system timing signals identifying predetermined synchronization times for initiating transmission clock synchronization, and distributing the system timing signals to the transmission stations, transmitting from the transmission stations, synchronization timing signals at the predetermined synchronization times, receiving the synchronization timing signals at the control station, and processing the synchronization signals to generate time adjustment factor signals, distributing the time adjustment factor signals to the transmission stations, and adjusting the transmission clocks at the transmission stations in response to the time adjustment factor signal received.

DESCRIPTION OF THE PREFERRED EMBODIMENTS

Figure 1A:
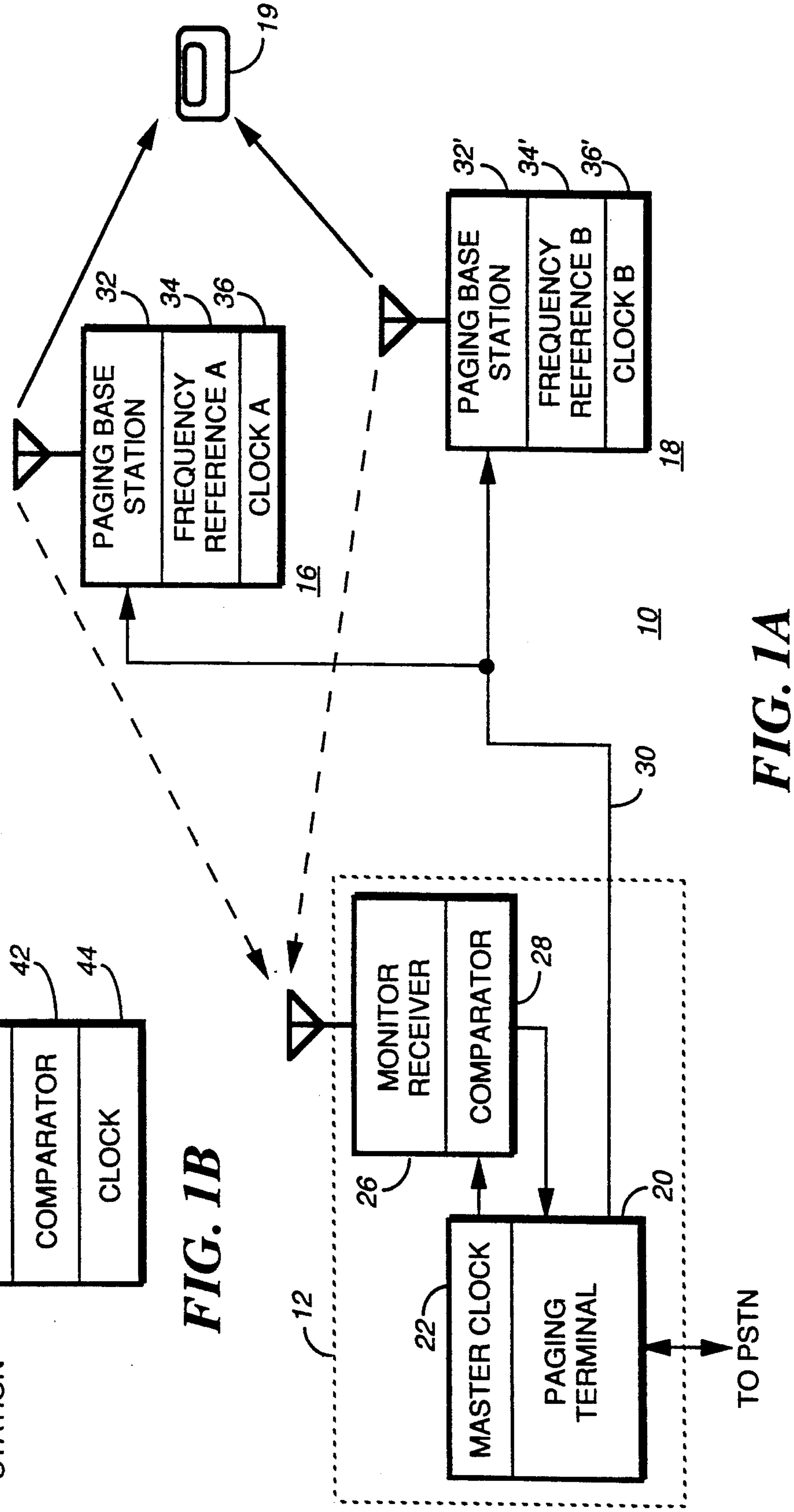
FIG. 1A is an electrical block diagram of a simulcast transmission system providing transmission clock synchronization in accordance with the preferred embodiment of the present invention.

Referring to the diagrams, FIG. IA is an electrical block diagram of a simulcast transmission system 10 providing transmission clock synchronization in accordance with the preferred embodiment of the present invention. The system 10 includes a control station 12 for controlling the distribution of system timing signals used for transmission clock synchronization and message transmission timing confirmation, and a plurality of transmission stations used to provide simulcast message transmissions, of which transmission stations 16 and 18 are shown for example only. The control station 12 includes a paging terminal 20 which is used to process message information received over the public switched telephone network, PSTN, and to distribute such information, or data, to the transmission stations 16, 18 for transmission to selective call receivers, such as but not limited to display pager 19. The operation of paging terminal 20 for collecting, processing and distributing message information is well known in the art. A master timing means, or master clock, is coupled to the paging terminal 20 and generates the system timing signals which are used to control the distribution of the message information, and the time synchronization information to the transmission stations, as will be described below. The control station 12 is coupled through a communication link 30, such as provided through the public switched telephone network, or through RF or microwave links to the transmission stations 16, 18. The communication link 30 enables the transmission of the message information between the control station 12 and the transmission stations 16, 18 in a manner well known in the art, and also provide for the distribution of the system timing signals which are utilized to control data transmissions and the transmission station clock synchronization, as will be described below.

The transmission stations 16, 18 include paging base stations 32, 32' which are utilized to transmit the message information throughout the simulcast transmission system 10 in a manner well known in the art. Frequency references 34, 34' are provided which are coupled to the paging base stations 32, 32', and which are utilized to establish, or control the carrier frequency of transmission. Also coupled to the frequency references 34, 34' are local transmission clocks 36, 36' which generate local timing signals which are used for controlling the transmission of the message information received from the control station 12. In particular, simulcast transmission of the message information is initiated from all transmission stations 16, 18 at predetermined transmission start times which are designated in the system timing signals and distributed from the control station 12. Also in response to the system timing signals, all transmission stations 16, 18 periodically transmit a synchronization packet including at least a timing word followed by a local time of transmission of the synchronization packet and a station ID. The synchronization packet is utilized to establish time synchronization of the local transmission clocks 36, 36' with the master clock 22, as will be described below.

The control station 12 also includes a monitor receiver 26 which is used to receive the synchronization packet transmitted from the transmission stations 16, 18. The local time of transmission signal when received by the monitor receiver 26 is coupled to a comparing means, or comparator 28, which compares the time of transmission with the current time of reception at the control station 12 in order to establish a time adjustment factor which will be used to synchronize the local transmission clocks used throughout the system with the master clock.

Operation of the simulcast transmission system in accordance with the preferred embodiment of the present invention can be summarized as follows. The paging terminal 20 sends clock synchronization timing information generated by the master clock 22 to the transmission stations 16, 18 using the standard communication link 30 provided. In response to the clock synchronization timing information, the transmission stations transmit a synchronization packet including at least a timing word, the local time of transmission signal and a station ID. A time correction factor is generated at the control station in response to receiving the local time of transmission signal. The time correction factor generated at the control station 12 is then distributed over the communication link 30 to the transmission stations 16, 18 for use in synchronizing the local transmission clocks 36, 36' at each transmission station with the master clock 22 at the control station 12. By periodically resynchronizing the local transmission clocks with the master clock, as described above, the simulcast transmission system in accordance with the present invention provides significantly improved control of message transmission times without the complexity or problems associated with audio signal equalization of the prior art systems, and without the use and expense of a complex global positioning satellite system. In addition, transmission frequency equalization can also be provided at the transmission stations 16, 18, as will be described below.

Figure 1B:
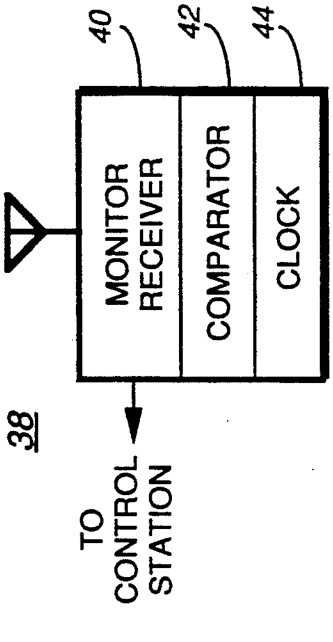
FIG. 1B is an electrical block diagram of a monitor receiving station used to provide transmission clock synchronization in accordance with an alternate embodiment of the present invention.

FIG. 1B is an electrical block diagram of a monitor receiver station 38 used to provide transmission clock synchronization. One or more monitor receiver stations are utilized in the simulcast transmission system in accordance with the present invention when the size of the system is so large that synchronization packet transmissions from all transmission stations within the system would not be directly received at the control station. The monitor receiver station 38 includes a monitor receiver 40 which is used to receive the synchronization packets transmitted from those transmission stations within radio contact with the monitor receiver station 38. The output of the monitor receiver 40 is coupled to a comparing means, such as a comparator 42 which compares the received time of transmission with the current time of reception generated by clock 44 in order to establish a time correction factor, as described above, which will be used to synchronize the local transmission clocks used throughout the system as described below. A further description of the monitor receiver stations is provided below.

Figure 2A:
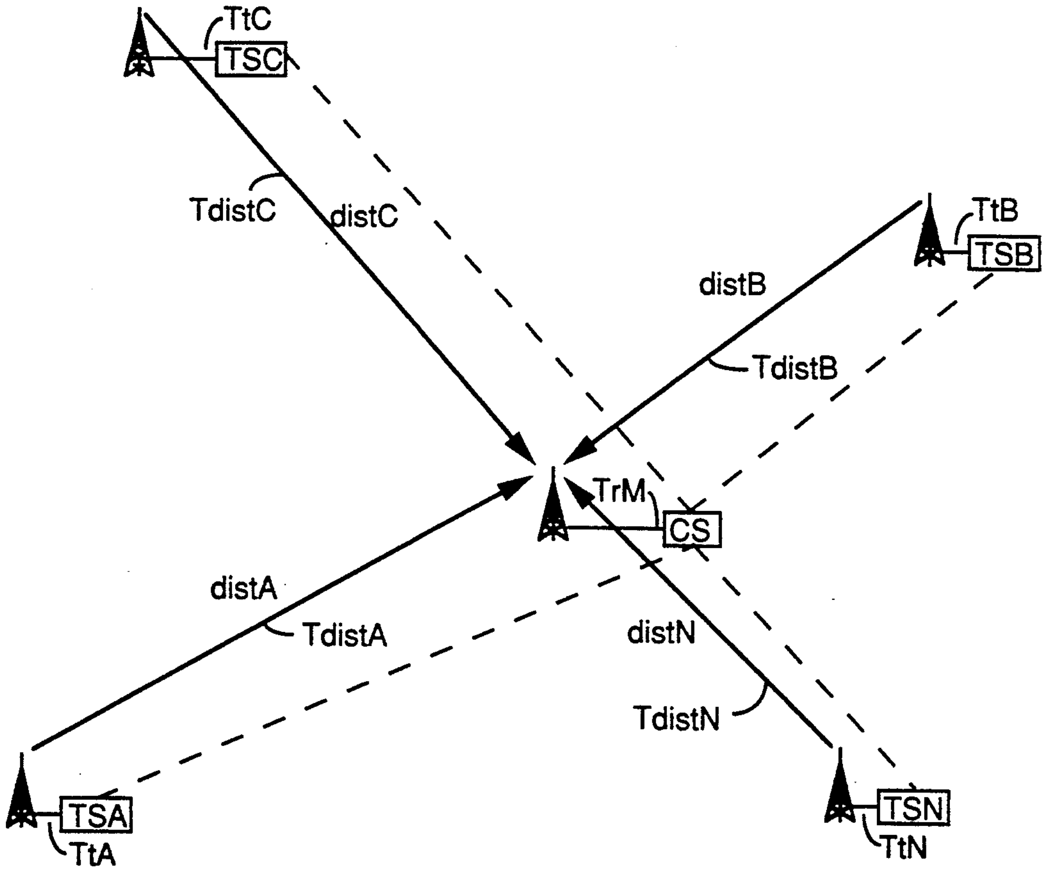
FIG. 2A is a timing diagram illustrating the timing considerations required to provide transmission clock synchronization for the simulcast transmission system in accordance with the preferred embodiment of the present invention.

Reference is directed to FIG. 2A which is a pictorial diagram illustrating the simulcast transmission system in accordance with the preferred embodiment of the present invention. As shown in FIG. 2A, the system includes a control station CS, and a plurality of transmission stations, indicated for example, TSA, TSB, TSC and TSN. The position and location of the control and transmission stations will depend on the area of coverage provided by the simulcast transmission system and more or less transmissions stations can be provided to provide the required system coverage area.

As described above, system timing signals are generated by the control station CS for distribution over the communication links (dashed lines) interconnecting the control station and the transmission stations. The system timing signals include timing information designating a start time for the transmission of synchronization information from the transmission stations TS. At the designated start time, each of the transmission stations, TSA, TSB, TSC and TSN in a predetermined sequence transmit synchronization packets including a timing word designating a predetermined time mark at which the local time of transmission from each transmission station is derived, as will be described below. The control station CS receives the synchronization packets and retrieves the actual time of reception for each synchronization packet in response to the time mark designated within the received timing word, which then enables a time correction factor to be calculated as follows:

$$T_{cfN} = T_{recN} - (T_{xmitN} + T_{distN})$$

where $T_{cfN}$ is the computed time correction factor value for transmission station N;

$T_{recN}$ is a first time value corresponding to the time of reception of the synchronization packet transmitted from transmission station N at the control station CS;

$T_{xmitN}$ is a second time value corresponding to the time of transmission of the synchronization packet from transmission station N; and $T_{distN}$ is the time correction factor corresponding to the distance between transmission station N and the control station CS.

The calculation described for generating the time correction factor includes measurements of such transmission delay factors as transmitter modulation delays TtN and antenna cable length variations at each of the transmitter stations, or monitor receiver stations. The time correction factor $T_{cfN}$ provides a direct measurement of the adjustment time required to synchronize the transmission station local clocks with the master clock at the control station. When the time correction factor $T_{cfN}$ calculated is negative, the local clock time leads the master clock time, indicating the local clock is currently running faster than the master clock at this measurement time interval. And when the time correction factor TcfN calculated is positive, the local clock time lags the master clock time, indicating the local clock is currently running slower than the master clock at this measurement time interval. Therefore, the amount and direction of correction of the local transmission station clocks relative to the master control station clock is readily provided.

Figure 2B:
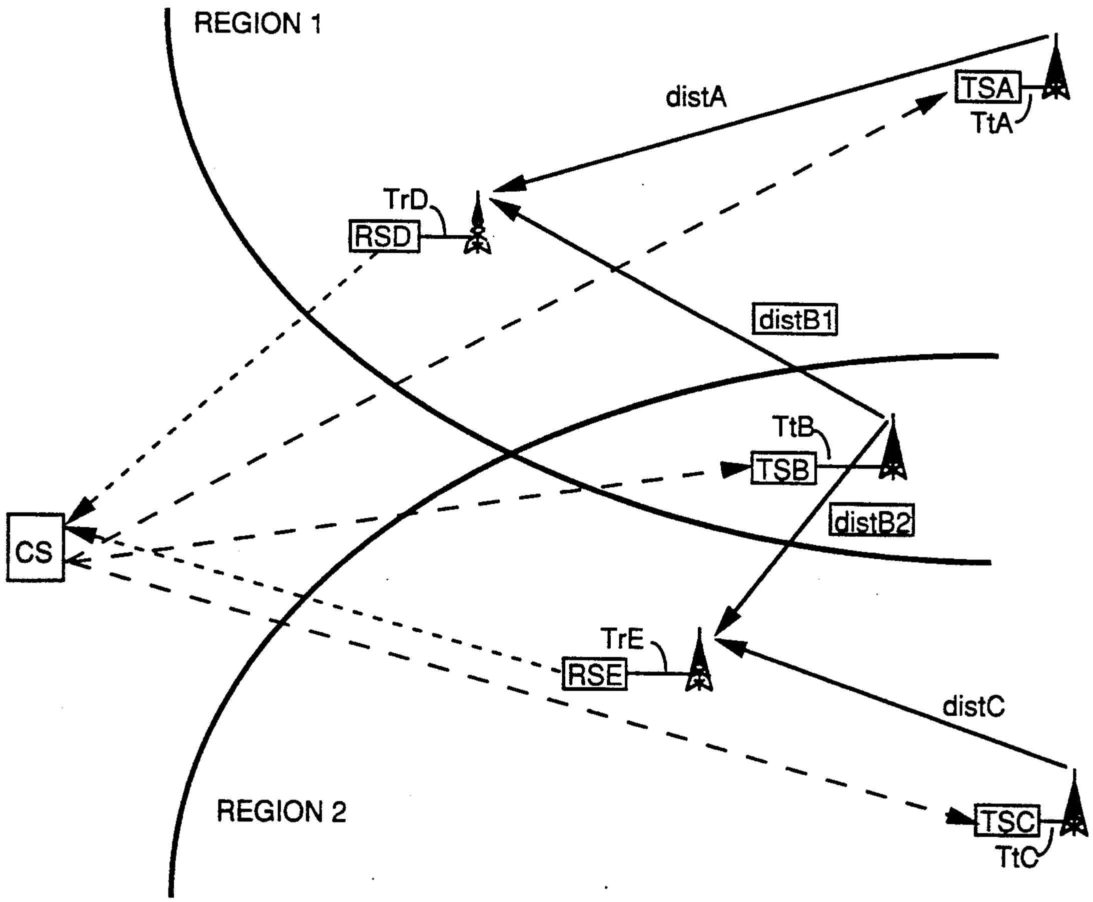
FIG. 2B is a timing diagram illustrating the timing considerations required to provide clock synchronization for the simulcast transmission system in accordance with an alternate embodiment of the present invention.

Reference is directed to FIG. 2B which is a pictorial diagram illustrating the simulcast transmission system in accordance with the alternate embodiment of the present invention. As shown in FIG. 2B, the system includes a control station CS, and a plurality of transmission stations, indicated for example, TSA, TSB and TSC. The position and location of the control station CS relative to the transmission stations is shown such that the transmission stations are beyond the range of being received. by a single monitor receiver, as described in FIG. 2A above. As shown in FIG. 2B, the simulcast transmission system includes at least two geographic areas, or regions (region 1 and 2), each of which includes monitor receiver stations RSD and RSE which are used to receive the synchronization packet transmissions, and which are in radio contact with the transmissions from transmission stations TSA and TSC, respectively. In addition, as shown in FIG. 2B, there exists at least one transmission station TSB which is located within an area generally overlapping region 1 and region 2, and which is in radio contact with both monitor receiver stations RSD and RSE.

As described above, system timing signals are generated by the control station CS for distribution over the communication links (dashed lines) interconnecting the control station CS and the transmission stations TSA, TSB and TSC. The system timing signals include timing information designating a start time for the transmission of synchronization information from the transmission stations TS. At the designated start time, each of the transmission stations, TSA, TSB and TSC in a predetermined sequence transmit synchronization packets including a timing word designating a predetermined time mark at which the local time of transmission from each transmission station is derived, as will be described below. The sequence of transmissions from the particular transmission station with each region is selected so as to allow simultaneous, non-interfering transmissions in each region thereby reducing the total overall time required to achieve clock synchronization. Monitor receiver station RSD receives the synchronization packets transmitted from transmission stations TSA and TSB, while monitor receiver station RSE receives the synchronization packets transmitted from transmission stations TSB and TSC. At monitor receiver station RSD, the actual time of reception for each synchronization packet in response to the time mark designated within the received timing word is received, which then enables a time correction factor relative to the monitor receiver station clock to be calculated as follows:

$$T_{cfD/A} = T_{recD/A} - (T_{xmitA} + T_{distA})$$

$$T_{cfD/B} = T_{recD/B} - (T_{xmitB} + T_{distB})$$

where $T_{cfD/A}$ is the computed time correction factor value for transmission station A relative to monitor receiver station D;

$T_{recD/A}$ and is a first time value corresponding to the time of reception of the synchronization packet transmitted from transmission station A at the monitor receiver station D;

$T_{xmitA}$ is a second time value corresponding to the time of transmission of the synchronization packet from transmission station A; and $T_{distA}$ is the time correction factor corresponding to the distance between transmission station A and the monitor receiver station D.

Likewise, at monitor receiver station RSE, the actual time of reception for each synchronization packet in response to the time mark designated within the received timing word is received, which then enables a time correction factor relative to the monitor receiver station clock to be calculated as follows:

$$T_{cfE/B}=T_{recE/B}-(T_{xmitB}+T_{distB})$$

$$T_{cfE/C}=T_{recE/C}-(T_{xmitC}+T_{distC})$$

The time correction factor information generated at monitor receiver stations RSD and RSE are next sent back to the control station CS over a communication link (shown as dashed lines), which can be part of the public switched telephone network (PSTN) or a radio or microwave link, as well. In order to establish the time adjustment factors which will be distributed to the transmission stations and monitor receiver stations to provide time correction of the station clocks, one of the stations is selected as a reference against which the other station time values are compared. In the preferred embodiment of the present invention, transmission station TSB is selected as the reference, since measurement values are common to both regions 1 and 2. The control station then calculates the time adjustment factors for transmission stations TSA and TSC as follows:

$$\begin{aligned} T_{adjA} &= \Delta t_{B/A} = T_{cfD/A} - T_{cfD/B} \\ &= T_{recD/A} - (T_{xmitA} + T_{distA}) - [T_{recD/B} - (T_{xmitB} + T_{distB})] \end{aligned}$$

$$\begin{aligned} T_{adjC} &= \Delta t_{B/C} = T_{cfE/C} - T_{cfE/B} \\ &= T_{recE/C} - (T_{xmitC} + T_{distC}) - [T_{recE/B} - (T_{xmitB} + T_{distB})] \end{aligned}$$

The control station also calculates the time adjustment factors for monitor receiver stations RSD and RSE which were directly derived from the measurements made at the monitor receiver stations as follows:

$$T_{adjD}=\Delta t_{D/B}=T_{recD/B}-(T_{xmitB}+T_{distB})$$

$$T_{adjE}=\Delta t_{tE/B}=T_{recE/B}-(T_{xmitB}+T_{distB})$$

The time adjustment factors $T_{adjA}$ $T_{adjC}$ $T_{adjD}$ and $T_{adjE}$ are then distributed from the control station CS to the corresponding transmission stations and monitor receivers stations to provide adjustment of the clocks, as will be described below. It will be appreciated that while computations have been provided above which indicate a preferred method for synchronizing the clocks of the transmission stations and the monitor receiver stations, any one of the stations could have been selected as the reference for defining the calculations made and distributed from the control station CS. It will also be appreciated that while only two regions were shown, the same calculations can be expanded to enable the time synchronization of a larger number of regions as well.

In summary, a method of computing time adjustment factors for individual transmission stations operating in a plurality of regions has been provided above. The method includes for the correction of the transmission delays encountered in the transmission of synchronization packet signals between the transmission stations and one or more monitor receiver stations. Selection of a suitable reference station was described, as well as computations for correcting the clocks of the monitor receiver stations. By periodically adjusting the local clock times relative to a selected reference clock time, as described above, simulcast transmission time equalization is provided.

Figure 3:
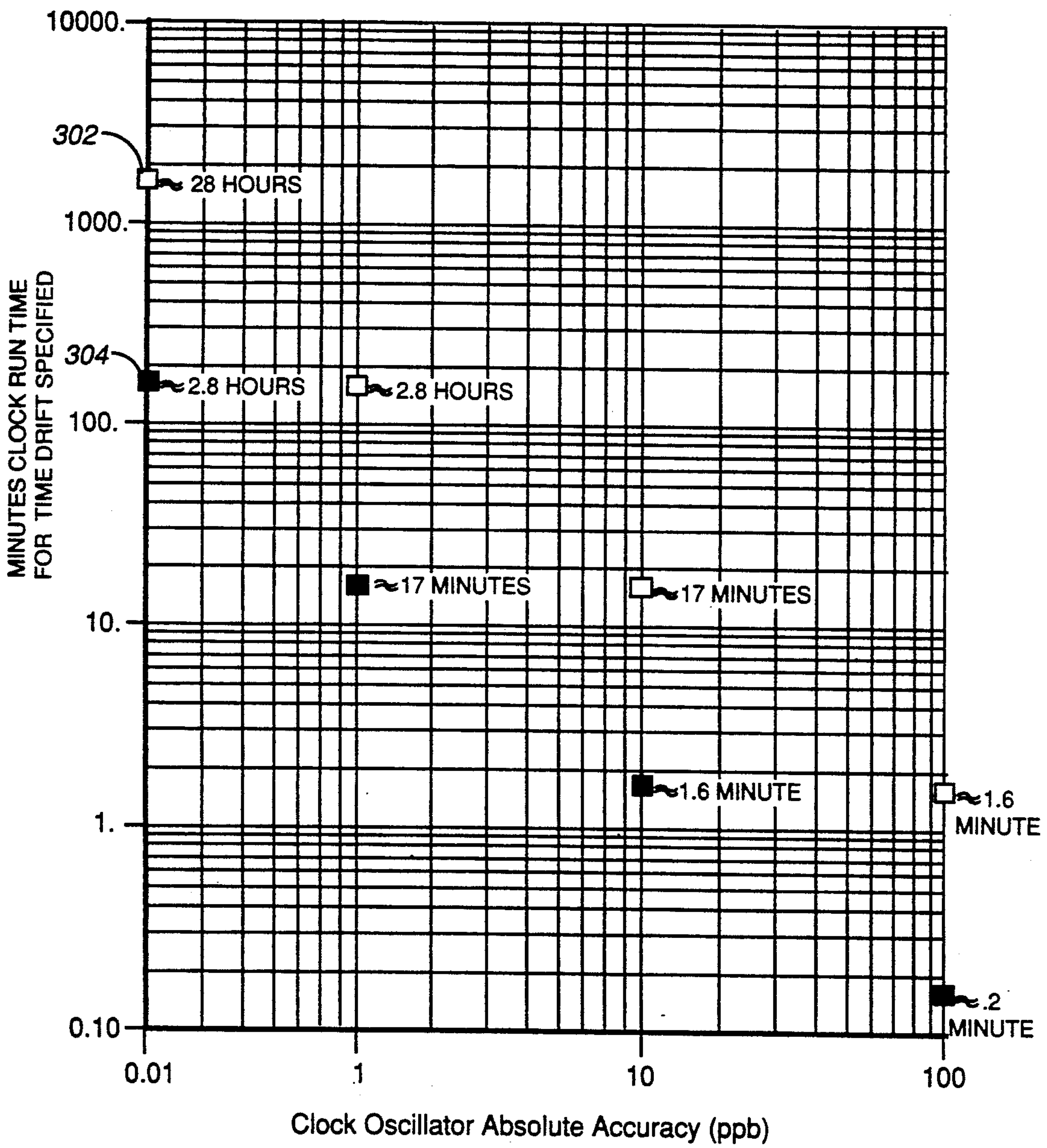
FIG. 3 is a graph depicting the accumulated clock time errors as a function of oscillator stability.

Reference is now directed to FIG. 3 which is a graph depicting the accumulated clock time errors as a function of oscillator stability which is utilized to determine the timing considerations for the periodic synchronization of the local clocks to the master clock in the preferred embodiment of the present invention. Data points indicated by boxes 302 represent maximum accumulated time errors of one microsecond, while data points indicated by boxes 304 represent maximum accumulated time errors of ten microseconds. FIG. 3 is best understood by way of example, such as that provided in TABLE I below which provides a comparison of the frequency of clock synchronization as a function the oscillator stability and the maximum accumulated system time error.

TABLE I

| Clock Oscillator Accuracy (ppb) | Max Accumulated Time Error (μS) | Run Time | Sync Interval |
|---|---|---|---|
| .1 | 1 | ~2.8 hrs | 1.4 hrs. |
| .1 | 10 | ~28 hrs | 14 hrs. |
| 1 | 1 | ~17 mins | 8.5 min. |
| 1 | 10 | ~2.8 hrs | 1.4 hrs. |

As shown in TABLE I, the run time is a function of both the clock oscillator absolute stability and the maximum accumulated time error allowable between the individual clocks within the system. The actual time between system synchronization cycles is actually one-half the run time shown, as two clock oscillators having the same absolute accuracy can accumulate the specified time error relative to each other in one-half the time since one can be drifting in a positive direction, while the other is drifting in a negative direction. It will be appreciated that the times represented are only approximate, and that the actual time is computed as shown below by dividing the Maximum Accumulated Time Error in μS by the Clock Oscillator Absolute Stability in ppb to determine the drift time in seconds which is then converted to minutes and hours in a manner well known in the art.

$$\text{Sync Interval} = \frac{\text{Max. Time Error}}{\text{Abs. Stability}} \text{ (sec)}$$

Clock oscillator accuracies of one part per billion can be readily achieved using high stability oven controlled crystal controlled oscillators. One such oscillator is the KXN1130AA OCXO manufactured by Motorola Inc. can provide a stability of 2 ppb. Other oscillator stabilities can be provided by utilizing other oscillator types, such as rubidium frequency standards for stabilities in the 0.01 ppb range.

Figure 4:
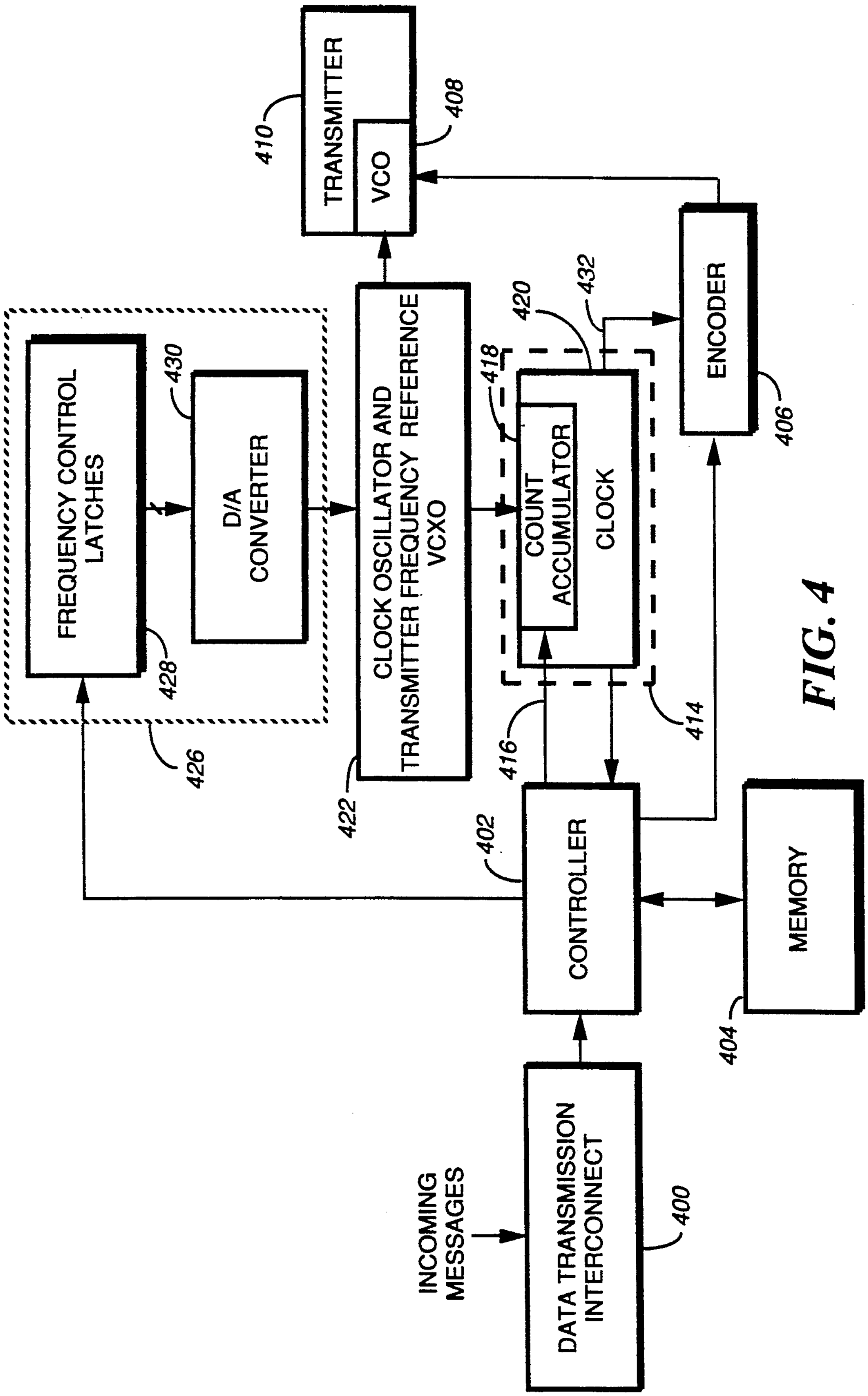
FIG. 4 is an electrical block diagram of a transmission station suitable for use with the preferred and alternate embodiments of the present invention.

FIG. 4 is an electrical block diagram of a transmission station suitable for use in the preferred embodiment of the present invention. As shown in FIG. 4, the transmission stations include a data transmission interconnect 400 which provides an interface between the transmission station and the communication link conveying the incoming messages and clock synchronization information from the control station. The data transmission interconnect 400 can provide any of a number of well known interface structures, such as a telephone interconnect and modem for use with the public switched telephone network, or a direct data input when interfacing with an RF or microwave link. The output of the data transmission interface 400 couples to an input of a transmission station controller 402. The controller 402 controls the total operation of the transmission station, performing such control operations as controlling the reception of data for transmission from the control station, controlling the reception of clock synchronization information from the control station, controlling the generation and transmission of the synchronization packet at the predetermined start time, controlling the reception of time adjustment information distributed from the control station, controlling the time synchronization of the local clock, and controlling the transmission of the data received from the control station. It will be appreciated that the controller is capable of controlling other control functions as well with regards to the operation of the transmission station. The controller 402 can be implemented using a microcomputer, such as an MC68030 microcomputer, or a digital signal processor, such as a DSP 65000 digital signal processor, both of which are manufactured by Motorola, Inc, or other microprocessors or digital signal processors. The choice of microcomputer or digital signal processor is dependent upon the level of signal processing to be ultimately handled by the controller 402. Also coupled to the controller 402 is a memory 404 which is used to store the data received from the control station prior to data transmission. The memory 404 can be any suitable form of random access memory, such as integrated dynamic random access memory (DRAM), a hard disk drive, or a combination thereof, just to name a few. The memory 404 can also include a read only memory section, such as provided by an electrically erasable programmable read only memory which is used to store routines used by the microcomputer or DSP to control transmission station operation. One output of controller 402 is coupled to an input of encoder 406 which encodes the data recovered for transmission into one of a number of signaling protocols, such as the POCSAG signaling format or the Golay Sequential Code signaling format, although it will be appreciated that any other signaling protocol could be encoded as well. The output of the encoder 406 is coupled to the modulation input of the transmitter voltage controlled oscillator 408 which modulates the transmitter carrier signal in a manner well known in the art. The output of the VCO 408 couples the modulated carrier signal to the transmitter which then amplifies the signal to a suitable power level for transmission. It will be appreciated that the controller and clock output can also be coupled to other types of modulators, such as a direct digital synthesized modulator, as well.

The local clock 414 is preferably a real time clock which comprises a count accumulator 418, which is preferably a frequency divider for dividing the clock oscillator output of frequency reference 422, although it will be appreciated other well known techniques would be required to generate non-integer frequency rates from the reference. The output of the count accumulator is decoded by clock circuit 420 to generate local timing signals, and more particularly, which generates the particular clock timing signals used to control the operation of the transmission station. A real time clock output is also generated which is used to trigger the start of the synchronization packet transmission during the clock synchronization periods, and to trigger the start of data transmission at the predetermined batch transmission start times to be described below. The local clock can alternately be implemented as a non-real time clock using dividers, as described above, to generate the required timing signals with a portion of the dividers forming the count accumulator 418 and functioning as an interval timer, the period of which represents the maximum time interval between clock synchronization cycles. In either instance, the time represented by the count accumulator 418 is advanced or retarded depending upon the time adjustment signal generated via a clock adjust output 416 which is coupled to an adjustment input of the count accumulator 418.

At the predetermined transmission time selected to begin transmission of the synchronization packet, the controller recovers and begins transmission of the timing word, and in response to the detection of the time mark transition included therein recovers the current time generated by the local clock 414 which is then transmitted as well. Following the distribution of the time adjustment factors, the controller generates the necessary clock advance or retard signal to correct the local clock time value.

A second output 424 of the controller 402 couples the clock adjustment information to the input of a reference frequency correction means 426 and is used to provide maintenance of the clock accuracy by compensating for the aging of the oscillator, which for an oversized crystal controlled oscillator such as the KXN1130AA can be$\pm$30 ppb per year. The reference frequency correction means includes frequency control latches 428 which are used to store the clock adjustment information between clock synchronization events. The output of the frequency control latches is coupled to an input of a digital to analog converter which converts the digital frequency adjustment information into an analog adjustment signal which is coupled to an adjustment input of the frequency reference 422. In the preferred embodiment of the present invention, the D/A converter 430 has a twelve bit resolution to provide the necessary resolution for correction of the reference frequency. The clock oscillator and transmitter frequency reference 422 is preferably an ovenized voltage controlled crystal oscillator (OVXCO) for use in the transmission stations which would provide clock synchronization intervals of on the order of eight and one-half minutes, as described above. The ovenized voltage controlled crystal oscillator (OVXCO) also provides a frequency reference output which is coupled to a second input of the VCO 408, as shown.

Because the rate of aging is significantly less than the time error accumulated, the time interval between frequency compensation events to compensate for aging can be significantly longer than required to correct clock error. As a result, while clock error compensation is periodically required at relatively short time intervals, the frequency compensation can be provided at significantly longer time intervals between compensation events, such as daily, weekly, or even monthly, the interval between adjustments being controlled by the controller 402, as required.

Figure 5:
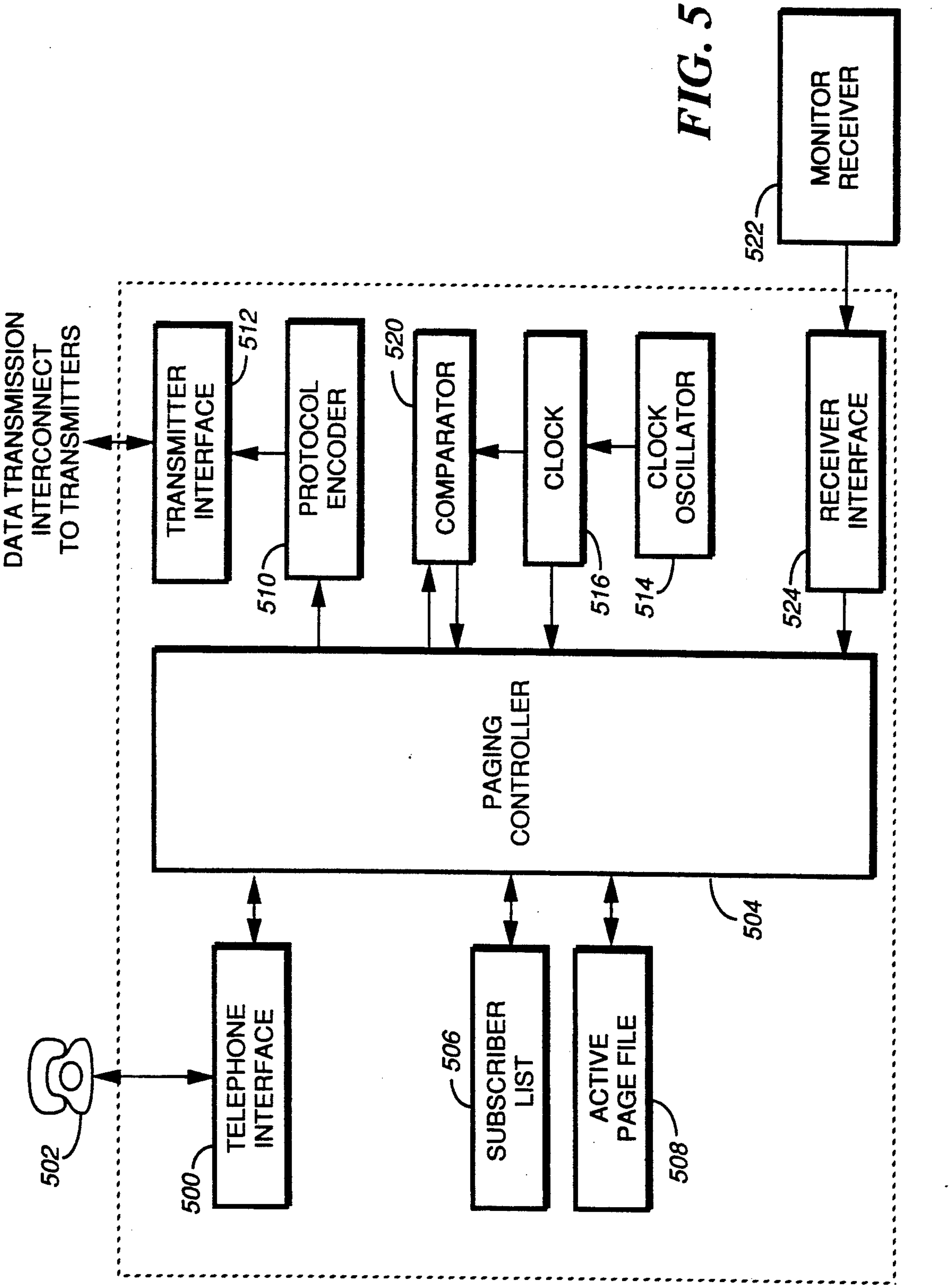
FIG. 5 is an electrical block diagram of a control station suitable for use with the preferred and alternate embodiments of the present invention.

Reference is directed to FIG. 5 which is an electrical block diagram of the control station 12. The control station 12 includes a telephone interface 500 which is coupled to the public switched telephone network over which message information is received from one or more input devices, such as a telephone 502, or data entry devices. A paging controller 504, or other controller such as utilized in queued transmission communication systems, is coupled to the telephone interface 500 and controls the processing of the message information as the information is received. A subscriber list memory is provided which stores information identifying the active subscribers belonging to the system, pager addresses and any other information which is required to identify the subscriber's receiver, or the receiver's operation. As the message information is received, the paging controller 504 routes the message information to a message queue in an active page file memory 508 where the message information is temporarily stored prior to distribution to the transmission stations. At periodic time intervals, to be described below, the message information stored in the active page file is recovered by the paging controller 504, and is processed by a protocol encoder 510 which encodes the message information in a format suitable for transmission. The output of the protocol encoder 510 is coupled to a transmitter interface 512 which then couples the encoded message information to the respective communication link for distribution to the transmitter stations. The operation of the control station, as described above for receiving, processing and distributing message information, such as used in paging, and is well known in the art.

A clock oscillator 514 generates timing information which is coupled to a system clock 516, which is utilized to generate the system timing signals described above. Periodically the paging controller formats clock synchronization information for distribution to the transmission stations which is then coupled by the paging controller 504 to a transmitter interface 512 which couples the information to the communication link. When only a single transmission region is provided, a monitor receiver 522 is coupled through transmitter interface 524 and is used to receive the synchronization packet transmissions from the transmissions stations. Following the reception of the synchronization packets, the paging controller decodes the received timing word to detect the synchronization time mark whereupon the current value of clock 516 is recovered and compared with the time information provided in the synchronization packet, using a comparing means, such as comparator 520 to calculate the corresponding time correction factor. The time correction factor information generated is then further process by the controller 504 to generate the time adjustment information for the transmission stations which is then distributed to the transmission stations over the communication link described above.

When multiple regions are provided within the system, the monitor receiver 522 can represent one of the monitor receivers as described in FIG. 2B, or may not be utilized. When separate monitor receiver stations are provided information generated at the monitor receiver stations is returned to the control station over the public switched telephone network, or other communication link such as an RF or microwave link.

Figure 6A:
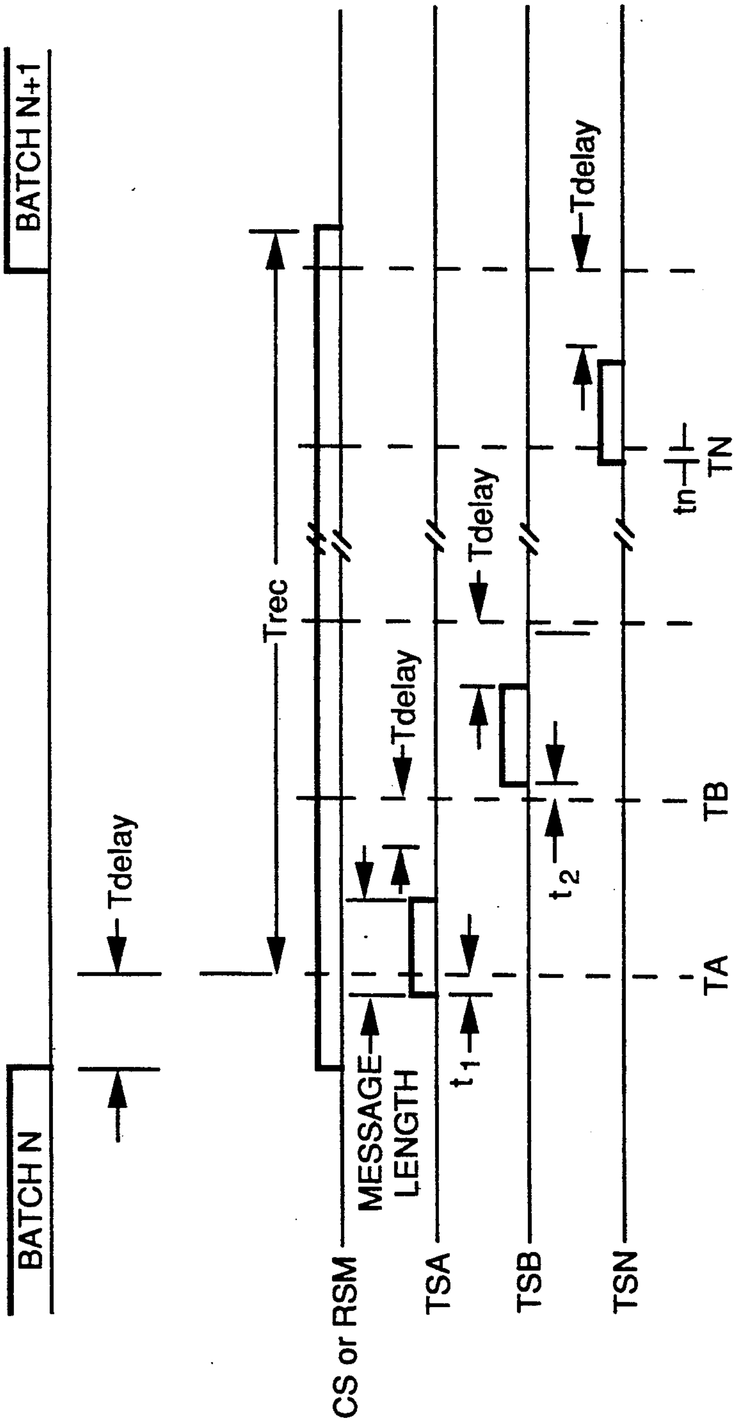
FIGS. 6A–B are pictorial diagrams illustrating the system transmissions in accordance with the preferred embodiment of the present invention.

Reference is directed to FIG. 6A which is a timing diagram illustrating the operation of the simulcast transmission system for providing clock synchronization in accordance with the preferred embodiment of the present invention. As shown in FIG. 6A, following the batch N transmission, the control station CS, or the monitor receiver station RSM, begins monitoring the transmission channel for the transmission of synchronization packets from the transmission stations located throughout the system. As previously described, the synchronization packet information is sequentially transmitted from the various transmission stations, as shown, wherein transmission station TSA responds first, followed by transmission station TSB, and so on, ending with the transmission from transmission station TSN. Times indicated $T_A$, $T_B$ and $T_N$ are the anticipated transmission times relative to the Control station transmission clock, however, as shown, transmission station TSA responds to a $T_1$ earlier than the anticipated time $T_A$, transmission station TSB responds at a time $t_2$ later than the anticipated time $T_B$, and transmission station responds at a time $t_N$ earlier than anticipated time $T_N$, the differences due to differences in the clock stabilities. Because of the stability differences between the initial and subsequent transmission station transmissions, the time between transmissions such as between times $T_A$ and $T_B$ corresponds to the message length and an additional delay t delay which is defined as a factor of at least twice the maximum allowable accumulated error over the batch transmission time period and the difference in time due to distances between stations. The transmissions of the synchronization packets from the transmission stations are guard banded by a factor of $$T_{delay}=2\times T_{smax}+(T_{distmax}-T_{distmin})$$

where $T_{delay}$ is the guard band time between sequential transmission station transmissions;

$T_{smax}$ is the maximum allowable accumulated error over the transmission time period;

$T_{distmax}$ is the time delay encountered to the furthest transmission station; and $T_{distmin}$ is the time delay to the closest transmission station.

The guard time prevents the simultaneous transmission of synchronization packet information which would create interference at the monitor receiver stations or control station.

Figure 6B:
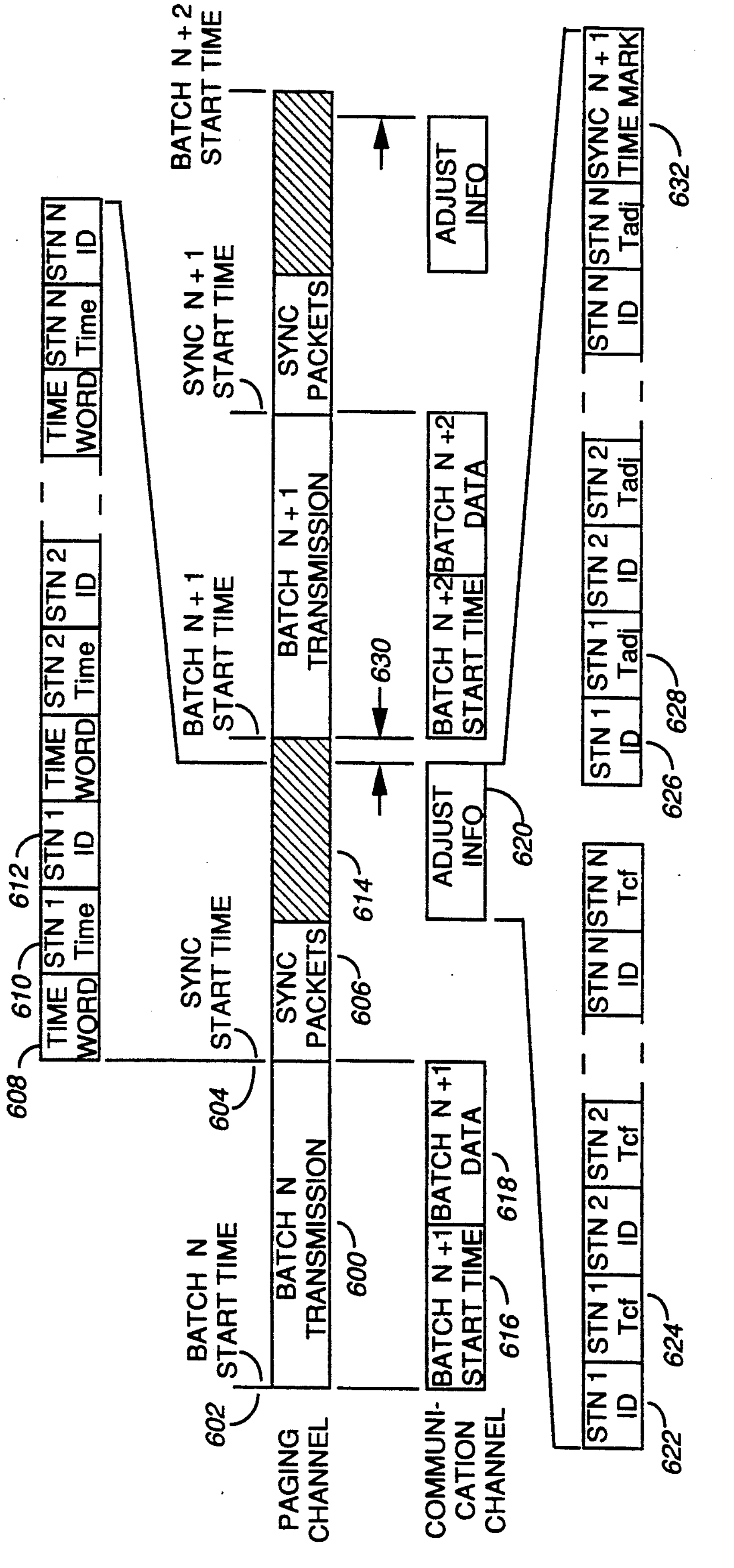

FIG. 6B is a timing diagram illustrating the operation of the simulcast transmission system for providing clock synchronization in accordance with the preferred embodiment of the present invention. As shown in FIG. 6B, information within the system is transmitted either on the paging channel, or distributed in the background on the communication channel. The information transmitted on the paging channel includes a batch N data transmission during time interval 600 which begins from all transmission stations at the batch N start time 602 designated in an earlier transmission originating from the control station, as will be described below. Following the batch N data transmission, at the predetermined synchronization start time 604, the transmission stations begin the sequential transmission of the synchronization packet information during time interval 606. The synchronization packet transmissions include a timing word 608 designating the time mark used to recover the time of transmission at the transmission station, and further used to recover the time of reception at the control station or the monitor receiver stations. Following the transmission of the timing word is the actual time of transmission 610 from the transmission station, followed by a station identification code word 612 which is used to verify the source of the transmission. The synchronization packet information is repeated for each transmission station, as shown. Following the transmission of the synchronization packet information during time interval 606, transmission is temporarily stopped during time interval 614 to enable processing of the synchronization packet information, distribution of the time adjustment factors, and local clock synchronization.

Information transmitted on the paging channel is first distributed to the transmission stations on the communication channel. During the transmission of data on the paging channel, a next batch, or batch N+1 start time during time interval 616 is transmitted, followed by the batch N+1 data during time interval 618. Following the reception of the synchronization packets at the monitor receiver stations, the time correction factor information obtained is sent back to the control station during a portion of time interval 620. The time correction factor information includes the station ID transmitted as for example during time interval 622 followed by the corresponding time correction factor value derived as for example at time interval 624. Following the reception of the time correction factor information at the control station, the information is processed as described above to generate the time adjustment factor values necessary to complete clock synchronization. During the balance of time interval 620, the time adjustment factor information is distributed to the transmission stations, and when appropriate to the monitor receiver stations. The time correction factor information includes the station ID transmitted as example during time interval 626 followed by the time adjustment factor value for the station transmitted as for example during time interval 628. Following the transmission of the time correction factor information to all stations, the transmission clocks are adjusted. After an appropriate guard band time interval 630, the next transmission of data begins on the paging channel beginning at the batch start time identified during time interval 616.

Figure 7:
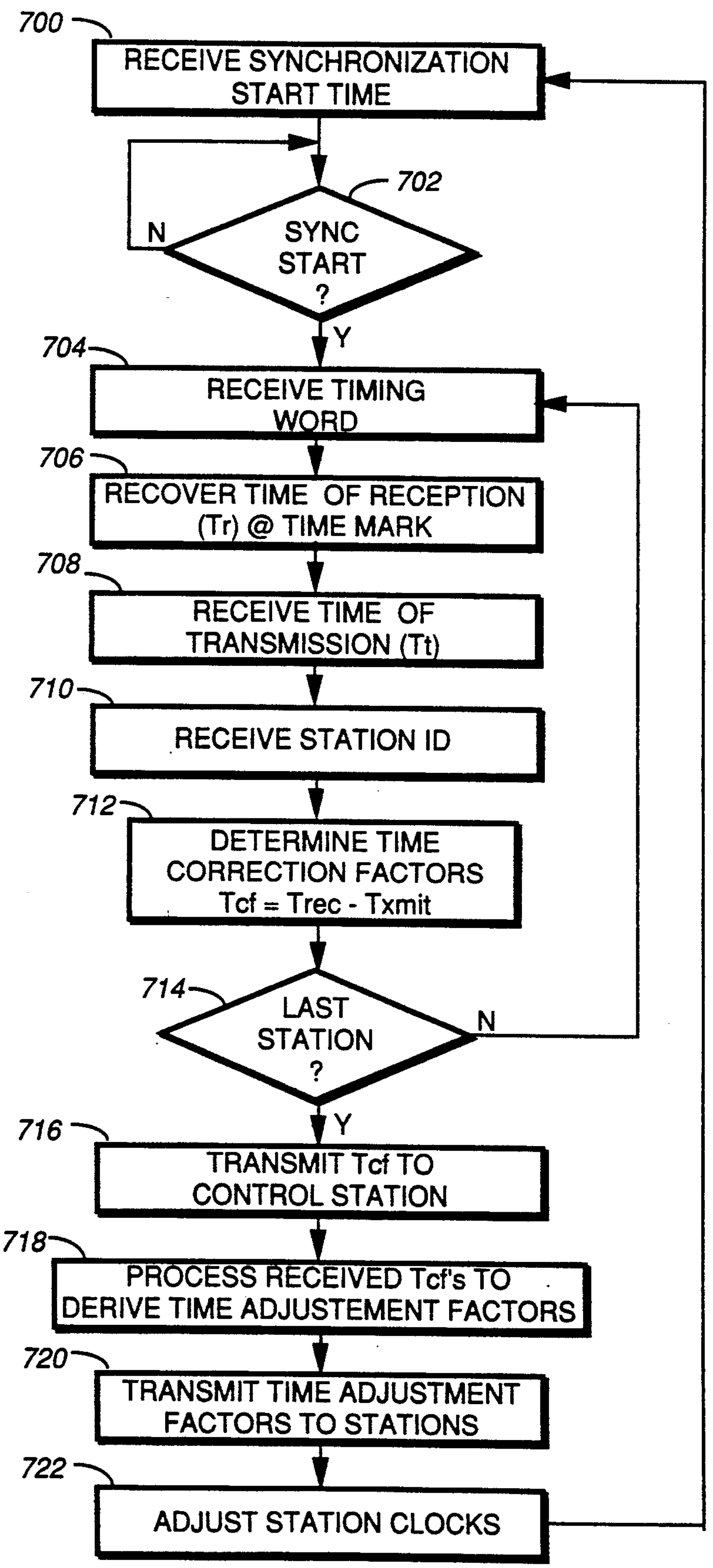
FIGS. 7 is a flow diagram describing the operation of the simulcast transmission system providing clock synchronization in accordance with the preferred embodiment of the present invention.

FIG. 7 is a flow chart describing the clock synchronization operation which occurs at the transmission stations, and when monitor receiver stations are included for providing clock synchronization for the monitor receiver stations as well. As shown, the transmission stations receive the synchronization start time at step 700 which is transmitted from the control station on the data channel. When each station determines the predetermined start time has been reached, at step 702, the first transmission station transmits a synchronization packet including a timing word followed by the actual time of transmission at the time mark indicated by the timing word and an identification code used to identify the transmission station. When the timing word is received at step 704, and at the time mark indicated by the timing word is detected at the control station or monitor receiver station, the time of reception Trec is retrieved from the local clock at step 706. The time of transmission Txmit of the timing word is then received, at step 708, followed by the station identification codeword at step 710. The time correction factor for the particular transmission station responding is computed at step 712. When additional transmission stations remain to transmit the synchronization packet at step 714, steps 704 through 712 are repeated. Following the response from the last transmission station at step 714, the time correction factor values determined are transmitted to the control station for processing at step 716. It will be appreciated that when the control station receives the synchronization packet information from the transmission stations, step 716 is unnecessary. The control station processes the received time correction factor values at step 718 to derive time adjustment factor values. The time adjustment factors derived are then distributed to the transmission stations, and when monitor receiver stations are included, to the monitor receiver stations, at step 720. After the time adjustment factor values have been received at each of the transmission stations, the clocks are adjusted according to the amount of adjustment required, at step 722. The transmission station then begin transmitting the message data on the paging channel at the predetermined transmission start time, and await for the reception of the next synchronization start time on the data channel at step 700.

In summary, synchronization start information generated at the control station and is periodically transmitted to the transmission stations over the data channel, enabling the transmission stations to periodically recover and transmit current time of transmission to the control station. The current time of transmission information received is then compared with the current time of reception information recovered at the control station. A time correction factor is then determined for each transmission station. In one embodiment, the time correction factor determined is used to provide a time correction factor which is used to correct the time value of the clocks at the individual transmission stations. In another embodiment, one of the transmission stations is then selected as the reference station to which all transmission station clocks are compared. Time adjustment information is then calculated relative to the selected reference station which is then used to correct the time value of the clocks at the individual transmission stations.

We claim:

1. A simulcast transmission system having means for time synchronizing data transmissions therefrom, comprising:

a plurality of transmission stations, each having means for receiving system timing signals from a control station, transmitting means for transmitting synchronization timing signals and data, and timing means for controlling the time of transmission of the synchronization timing signals and the data, the synchronization timing signals indicating a local time of transmission thereof and being transmitted therefrom in response to the system timing signal received from the control station; and said control station comprising means for generating and distributing the system timing signals to said plurality of transmission stations, means for receiving the synchronization timing signals transmitted from said plurality of transmission stations, means responsive to the received synchronization timing signals for generating time adjustment factor signals and means of distributing the time adjustment factor signals to said transmission stations for effecting adjustment of said timing means for controlling the time of transmission of the synchronization timing signals and data therefrom.

2. The simulcast transmission system according to claim 1, wherein said means for generating time adjustment factor signals comprises:

means, responsive to the reception of the synchronization timing signals, for locally generating time of reception signals; and means for comparing the received synchronization timing signals with the locally generated time of reception signals for generating the time adjustment factor signals.

3. The simulcast transmission system according to claim 2, wherein said means for comparing comprises a microcomputer.

4. The simulcast transmission system according to claim 3, wherein the time adjustment factor signals include a time adjustment factor value calculated by said microcomputer using the fomrula $$T_{cfN}=T_{recN}-(T_{xmitN}+T_{distN})$$

where $T_{cfN}$ is the time adjustment factor value computered for a transmission station N, where N designated one of said plurality of transmission stations;

$T_{recN}$ is a first time value corresponding to the time of reception of the synchronization timing signals transmitted from said transmission station N at said control station;

$T_{xmitN}$ is a second time value corresponding to the time of transmission of the synchronization timing signals from said transmission station N; and TdistN is a third time value corresponding to the distance between said transmission station N and said control station.

5. The simulcast transmission system according to claim 4, wherein said timing means comprises:

means for generating frequency reference signals; and clock means, responsive to the frequency reference signals, for controlling the time of transmission of synchronization timing signals and data.

6. The simulcast transmission system according to claim 1, wherein the synchronization timing signals are transmitted sequentially in a predetermined order from said plurality of transmission stations.

7. The simulcast transmission system according to claim 1, wherein said means for receiving synchronization timing signals comprises a receiver located at said control station.

8. The simulcast transmission system according to claim 1, wherein said means for receiving synchronization timing signals comprises at least one monitor receiver station for receiving the synchronization timing signals transmitted from at least a portion of said transmission stations, said monitor receiver station being located apart from said control station.

9. The simulcast transmission system according to claim 8, wherein said means for receiving synchronization timing signals comprises at least two monitor receiver stations for collectively receiving the synchronization timing signals transmitted from said transmission stations.

10. The simulcast transmission system according to claim 8, wherein said monitor receiver station comprises:

means for receiving the transmitted synchronization timing signals;

means or generating time correction factor signals in response thereto; and means for communicating the time correction factor signals to said control station.

11. The simulcast transmission system according to claim 10, wherein said means or generating time correction factor signals comprises:

means for locally generating time of reception signals; and mean for comparing the received synchronization timing signal with the locally generated time of reception signals for generating the time correction factor signals.

12. The simulcast transmission system according to claim 10, wherein said control station further comprises means or processing the time correction factor signals received from said monitor receiver stations to generate the time adjustment factor signals.

13. The simulcast transmission system according to claim 11, wherein said means for comparing comprises a microcomputer.

14. The simulcast transmission system according to claim 13, wherein the time correction factor signals include a time correction factor value calculated by said microcomputer using the fomrula $$TcfnN/RS=T_{recN}-(T_{xmitN}+T_{distN})$$

where $T_{cfN/RS}$ is the time correction factor value computed for a transmission station N at a monitor receiver station RS, where N designates one of said plurality of transmission stations;

$T_{recN}$ is a first time value corresponding to the time of reception of the synchronization timing signals transmitted from said transmission station N at said monitor receiver station RS;

$T_{xmitN}$ is a second time value corresponding to the time of transmission of the synchronization timing signals from transmission station N; and TdistN is a third time value corresponding to the distance between said transmission station N and said monitor receiver station RS.

15. The simulcast transmission system according to claim 1, wherein the synchronization timing signals are transmitted in a synchronization packet comprising a timing word including a timing mark, and at least a time of transmission of the timing word measured from the transmission of the timing mark.

16. The simulcast transmission system according to claim 1, wherein the system timing signals are periodically generated.

17. The simulcast transmission system according to claim 5, wherein said frequency reference signal generating means is responsive to the time adjustment factor signals, and said timing means further comprises:

mean for storing the time adjustment factor value; and converter means, coupled to said storing means, for converting the stored time adjustment factor value into a frequency adjustment factor signal.

18. The simulcast transmission system according to claim 17, wherein the frequency adjustment factor value is a digital information sequence, and wherein said converter means converts the digital information sequence into an analog signal corresponding of the frequency adjustment factor signal.

19. A method of time synchronizing data transmissions originating from a plurality of transmission stations operating within a simulcast transmission system, the transmission stations having transmission clocks for controlling the starting time of the data transmissions, said method comprising the step of:

generating, at a control station, system timing signals identifying predetermined synchronization times for initiating transmission clock synchronization, and distributing the system timing signals to the transmission stations;

transmitting from the transmission stations, synchronization timing signals at the predetermined synchronization times;

editing the synchronization timing signals at the control station, and processing the synchronization signals to generate time adjustment factor signals;

distributing the time adjustment factor signals to the transmission stations; and adjusting the transmission clocks at the transmission stations in response to the time adjustment factor signal received.

* * * * *